US010870605B2

(12) United States Patent
Gueguen et al.

(10) Patent No.: US 10,870,605 B2
(45) Date of Patent: Dec. 22, 2020

(54) REFRACTORY MOLDED BODY, COMPOUNDS, BINDERS, AND METHOD FOR PRODUCING SAME

(71) Applicant: MAGNESITA REFRACTORIES GMBH, Hilden (DE)

(72) Inventors: Erwan Gueguen, Villers la Ville (BE); Christos G. Aneziris, Freiberg (DE); Christiane Biermann, Freiberg (DE); Antoine Ducastel, Essen (DE)

(73) Assignee: REFRACTORY INTELLECTUAL PROPERTY GMBH & CO. KG, Vienna (AT)

( * ) Notice: Subject to any disclaimer, the term of this patent is extended or adjusted under 35 U.S.C. 154(b) by 0 days.

(21) Appl. No.: 16/063,044

(22) PCT Filed: Jul. 29, 2016

(86) PCT No.: PCT/DE2016/100348
§ 371 (c)(1),
(2) Date: Jun. 27, 2018

(87) PCT Pub. No.: WO2017/118449
PCT Pub. Date: Jul. 13, 2017

(65) Prior Publication Data
US 2018/0362408 A1 Dec. 20, 2018

(30) Foreign Application Priority Data
Jan. 4, 2016 (DE) ........................ 10 2016 100 083

(51) Int. Cl.
*C04B 35/04* (2006.01)
*C04B 35/01* (2006.01)
*C04B 35/103* (2006.01)
*C04B 35/626* (2006.01)
*C04B 35/63* (2006.01)
*C04B 35/10* (2006.01)
*C04B 35/66* (2006.01)
*C04B 35/632* (2006.01)
*C04B 35/52* (2006.01)
*C04B 35/634* (2006.01)

(52) U.S. Cl.
CPC ............ *C04B 35/013* (2013.01); *C04B 35/04* (2013.01); *C04B 35/10* (2013.01); *C04B 35/103* (2013.01); *C04B 35/522* (2013.01); *C04B 35/626* (2013.01); *C04B 35/6268* (2013.01); *C04B 35/62645* (2013.01); *C04B 35/632* (2013.01); *C04B 35/6303* (2013.01); *C04B 35/6316* (2013.01); *C04B 35/63492* (2013.01); *C04B 35/66* (2013.01); *C04B 2235/3231* (2013.01); *C04B 2235/3418* (2013.01); *C04B 2235/3804* (2013.01); *C04B 2235/3821* (2013.01); *C04B 2235/3826* (2013.01); *C04B 2235/3843* (2013.01); *C04B 2235/3852* (2013.01); *C04B 2235/402* (2013.01); *C04B 2235/425* (2013.01); *C04B 2235/428* (2013.01); *C04B 2235/48* (2013.01); *C04B 2235/5427* (2013.01); *C04B 2235/5436* (2013.01); *C04B 2235/6021* (2013.01); *C04B 2235/6027* (2013.01); *C04B 2235/65* (2013.01); *C04B 2235/658* (2013.01)

(58) Field of Classification Search
CPC ............ C04B 35/013; C04B 35/63492; C04B 35/6316; C04B 35/522; C04B 35/62645; C04B 35/103; C04B 35/04; C04B 35/66; C04B 35/632; C04B 2235/5436; C04B 2235/5427; C04B 2235/45; C04B 2235/428; C04B 2235/425; C04B 2235/402; C04B 2235/3826; C04B 2235/3821; C04B 2235/3804; C04B 2235/3231
See application file for complete search history.

(56) References Cited

U.S. PATENT DOCUMENTS

| 3,513,001 | A |   | 5/1970  | Worthington |           |
|-----------|---|---|---------|-------------|-----------|
| 3,808,159 | A |   | 4/1974  | Matalon     |           |
| 3,885,985 | A | * | 5/1975  | Serafin     | C04B 28/02 |
|           |   |   |         |             | 106/820   |
| 4,205,040 | A | * | 5/1980  | Aoyama      | B28B 7/362 |
|           |   |   |         |             | 264/233   |
| 4,209,335 | A | * | 6/1980  | Katayama    | B09C 1/08 |
|           |   |   |         |             | 106/645   |
| 4,286,991 | A | * | 9/1981  | Galer       | C04B 28/065 |
|           |   |   |         |             | 106/695   |
| 5,264,470 | A | * | 11/1993 | Eoff        | C04B 24/06 |
|           |   |   |         |             | 524/4     |

(Continued)

FOREIGN PATENT DOCUMENTS

| DE | 2050501 A  | 5/1972 |
| DE | 10304748 A | 7/2004 |

(Continued)

*Primary Examiner* — Noah S Wiese
(74) *Attorney, Agent, or Firm* — Andrew Wilford

(57) ABSTRACT

The present invention relates to a compound for making high-temperature-resistant or refractory molded bodies, made up of a mixture of:

a refractory or high-temperature-resistant inorganic powder, granules and/or granulate, including a free-flowing compound or a powder made of carbon or also without carbon, a binder, the binder being made of a combination of tannin, lactose, fine-grained silica and aluminum powder, as well as the binder itself, and molded bodies produced from the compound including the binder, and a method of making same.

20 Claims, No Drawings

(56) References Cited

U.S. PATENT DOCUMENTS

| | | | | |
|---|---|---|---|---|
| 5,342,445 A | * | 8/1994 | Kiyomoto | C04B 28/08 |
| | | | | 106/789 |
| 5,532,330 A | | 7/1996 | Pizzi | |
| 5,833,883 A | | 11/1998 | Afzali-Ardakani | |
| 6,846,766 B1 | | 1/2005 | Bartha | |
| 8,153,563 B2 | * | 4/2012 | Morgan | C04B 28/02 |
| | | | | 106/696 |
| 2005/0181067 A1 | * | 8/2005 | Yokoyama | A61K 8/11 |
| | | | | 424/641 |
| 2006/0214142 A1 | * | 9/2006 | Nikkeshi | C08K 5/098 |
| | | | | 252/601 |
| 2010/0035775 A1 | * | 2/2010 | Viswanathan | C01B 25/08 |
| | | | | 508/123 |
| 2011/0182796 A1 | | 7/2011 | Lang | |
| 2014/0171355 A1 | * | 6/2014 | Bellon | A61Q 13/00 |
| | | | | 512/2 |
| 2014/0238268 A1 | | 8/2014 | Umemura | |
| 2018/0071433 A1 | * | 3/2018 | Abdalla | A61L 27/3834 |

FOREIGN PATENT DOCUMENTS

| | | |
|---|---|---|
| DE | 69730221 U | 8/2005 |
| GB | 1575649 B | 9/1980 |

\* cited by examiner

REFRACTORY MOLDED BODY, COMPOUNDS, BINDERS, AND METHOD FOR PRODUCING SAME

CROSS REFERENCE TO RELATED APPLICATIONS

This application is the US-national stage of PCT application PCT/DE2016/100348 filed 29 Jul. 2016 and claiming the priority of German patent application 102016100083.3 itself filed 4 Jan. 2016.

FIELD OF THE INVENTION

The present invention relates to a compound for making refractory molded bodies including a mixture of a refractory or high-temperature-resistant inorganic powder, granules and/or granulate, as well as a binder, preferably by adding a free-flowing material or a powder made of carbon.

Furthermore, the present invention relates to a binder for making refractory compounds or molded bodies for such compounds and molded bodies made of such materials including binders.

Finally, the present invention relates to a method of making refractory molded bodies or compounds from a high-temperature-resistant or refractory inorganic powder, granules and/or granulate and a binder.

BACKGROUND OF THE INVENTION

Carbon-bonded, graphite-containing products are widely used as linings in metallurgical vessels, such as carbon-bonded magnesia bricks in the converter or as key components, for example immersion nozzles or slide plates or plugs or casting passages in continuous casting. Carbon-bonded, refractory products continue to be used in blast furnaces, in transport vessels such as ladles or in the chemical industry or in the waste-incineration industry as high-temperature-resistant pipes, or in the cement industry as lining material.

Here, preferably pure phenolic resins, such as resoles or novolaks, synthetic pitch tars such as Carbores or coal pitch tars, are used as binders. In order to optimize the oxidation resistance of phenol-containing, carbon-bonded products, predominantly metallic additives, such as, for example, Si or Al or Mg, are used. DE 199 54 893 [U.S. Pat. No. 6,846,766] describes carbon-bonded products having improved oxidation behavior. By adding a catalytically active substance from the group of readily reducible compounds of the transition elements, in particular metallocenes or metallobenzoates or metallonbentenates of copper, chromium, nickel or iron into the synthetic-resin component, a highly crystalline graphitized carbon is generated under 1000° C., which improves chemical properties.

The known binder systems have enormous problems with regard to their environmental friendliness and occupational safety, either via free phenol particles in the case of the resins or via their benzo [a] pyrene content in the case of the pitch-base binders.

OBJECT OF THE INVENTION

Based on this prior art, the object of the present invention is to create environmentally friendly, refractory, preferably carbon-bonded, graphite-containing molded bodies and compounds of fine and coarse-grained inorganic raw materials with or without further carbon additives based on environmentally friendly binders that have very good mechanical, thermomechanical and chemical properties for application temperatures in the temperature range of 500° C. to 2000° C.

Natural or synthetic raw materials having a particle size of ≤100 µm are referred to as fine-grained inorganic raw materials, natural or synthetic raw materials having a particle size of >100 µm are referred to as coarse-grained inorganic raw materials.

Furthermore, the object of the present invention is to provide an environmentally friendly binder for refractory products with or without carbon additives, which meets the strength requirements for sufficient oxidation and corrosion resistance in combination with low porosities.

SUMMARY AND DESCRIPTION OF THE INVENTION

In order to achieve this object, the present invention proposes that the binder includes a combination of tannin, lactose, fine-grained silica and aluminum powder.

Furthermore, the present invention provides a binder for making corresponding compounds or molded bodies including a combination of tannin, lactose, fine-grained silica and aluminum powder.

Preferably, the ratio of lactose to tannin is between 0.1 and 0.3.

Furthermore, it is provided for the binder that the fine-grained silica preferably has a particle size of <50 µm, preferably <1 µm, and that the aluminum powder has a particle size of <200 µm.

The present invention also proposes that phenolic resin in powder form up to 30 wt. % based on the mixture of lactose and tannin is added to the binder.

Also, the present invention proposes that further fine-grained additives are added to the binder, namely magnesium or carbides, in particular SiC, $B_4C$, TiC, or nitrides, in particular $Si_3N_4$, AlN, TiN, or borides, in particular BN, $TiB_2$.

It may also be preferred to add doped silicon to the binder.

In particular, it is preferred to add ethylene glycol to the binder, preferably in an amount of from 0.1 to 5 wt. % based on the total amount of the binder.

It is also preferred that the proportion of tannin is greater than the proportion of lactose, preferably 70 to 90 wt. % based on the total amount of the binder. For the compound for making corresponding products of the mixture including the binder, it is preferably provided that the added carbon is graphite and/or carbon black and/or carbon fiber material and/or carbon nanotubes (CNTs) and/or graphene and/or carbonized pitch, bitumen or phenolic resin.

The corresponding compound is preferably mixed with the binder according to the above definition.

Preferably a proportion of up to 50 wt. % of the binder is added to the compound, preferably of 0.5 to 20 wt. %, particularly preferably of 2 to 8 wt. % based on the total compound.

According to the present invention, furthermore a molded body is provided that is made of such a compound including a binder.

The invention furthermore relates to a method of making refractory or high-temperature-resistant molded bodies or compounds of a high-temperature-resistant or refractory inorganic powder, granules and/or granulate having a binder, according to the present invention at least one inorganic coarse granulation of >100 µm and carbon having a combined binder based on tannin, lactose, fine-grained silica and aluminum powder is added to an inorganic fine granulation of <100 μm, and they are mixed, preferably in a mixer, this mixture being transferred via a primary shaping method, for example, casting, pressing, extruding, into a product treated thermally before or during use at temperatures >100° C., preferably in two process stages, namely a first stage at up to 250° C., and a second stage at temperatures above 600° C., preferably while excluding oxygen.

According to the present invention, compounds and/or binders are used in these methods, as indicated in the claims.

The present invention relates to a combined binder system for making refractory, carbon-bonded, graphite-containing molded bodies and compounds based on tannin, lactose, fine-grained $SiO_2$ and aluminum in combination with at least one refractory coarse granulation.

According to the present invention, the binder system os environmentally friendly and, according to the present invention, can also contribute, in combination with other less environmentally friendly binders to a reduction of health-endangering emissions.

According to the present invention, the combined binder system may be made of tannin, lactose, fine-grained $SiO_2$, aluminum and phenol-containing powder resin.

According to the present invention, ethylene glycol is added as a solvent during preparation of the compound in a mixer for press molding.

The used inorganic granules can be made of oxidic, non-oxidic natural or synthetic raw materials, carbon or metallic granules. The particle sizes of the used raw materials are in the range up to 30 mm.

Calcium oxide, magnesium oxide, dolomite, chromium oxide, aluminum oxide, mullite, zirconium mullite, zirconium dioxide, magnesium aluminate spinel, bauxite, yttrium oxide, and titanium dioxide, for example, can serve as oxidic granules.

Silicon carbide, silicon nitride, boron nitride, boron carbide and carbon, for example, can serve as nonoxidic granules.

According to the present invention, graphite and/or carbon black and/or carbon fiber and/or carbon nanotubes (CNTs) and/or graphene and/or carbonized pitch, bitumen or phenolic resin serve as carbon carriers.

According to the invention, this binder system in combination with at least one inorganic coarse granulation is particularly suitable for conventional slip casting, for pressure slip casting, for the casting of vibration compounds and self-flowing compounds, as a binder for moldable compounds during extrusion, in press molding and especially for uniaxial pressing and cold isostatic pressing.

According to the present invention, saccharides, for example lactose from the food industry, in combination with polyhydroxy phenols having ortho phenolic hydroxyl groups, for example tannin from secondary plant ingredients, serve as a new absolutely environmentally friendly binder system in carbon-containing or carbon-free refractory mixtures made of oxides, non-oxides with or without carbon in the form of graphite, graphene or carbon black for making refractory products.

Lactose is also called milk sugar or saccharum lactis. Lactose represents a disaccharide made up of D-glucose and D-galactose in a −1,4-glycosidic linkage (4-0-(-D-galactopyranosyl-D-glucopyranose).

Lactose is composed of its stereoisomers, the α- and β-form. It thus occurs in various forms:
α-lactose monohydrate;
stable anhydrous α-lactose;
unstable anhydrous α-lactose;
amorphous lactose;
α-lactose;
β/α-composite crystals.

Lactose occurs naturally in milk and dairy products. The proportion of milk sugar in the milk is approximately 5%. The base product for making lactose is whey from cheese production and that contains 4-5% lactose. Finally, by ultrafiltration and crystallization, the final product, lactose, is obtained in different purities after filtering, purifying and drying.

There are various possibilities for the classification of tannins. In the present invention, tannins are classified as follows into hydrolyzable tannins (or gallotannins) and condensed tannins (or catechin tanning agents). Condensed tannins (also called proanthocyanidin) represent a dimer or a higher oligomer of the flavan-3-ol. Hydrolyzable tannins, as their name implies, can be hydrolyzed into glucose, polyhydric alcohols, gallic acid or ellagic acid.

| | Tannin | |
|---|---|---|
| hydrolyzable tannins | | condensable tannins |
| gallotannin | | proanthocyanidin |
| ellagtannin | | flavan-3-ol (catechin) |
| polymerized | | |
| central polyols via | | |
| hydroxyl groups | | or flavan-3,5-diols |
| + | | |
| one or a plurality of | | |
| phenolic group(s) | | flavonoids |
| (gallic acid) esterified | | |
| hexahydroxy-flavans | | penta- and |
| (for example, corilagin) | | (for example, quebracho tannin) |

To make tannin one starts with bark or wood of tropical or subtropical wood species. In the case of quebracho tannins, it is *Schinopsis balansae*. It is sourced by extraction from aqueous, alkaline solutions. One last step is spray drying and the finished tannin is marketed in powder form.

According to the present invention, quebracho tannin, a cost-effective variant, is preferred from the plurality of tannins. Another reason is the activity of 5/11 quebracho tannin, as condensed tannin vis-a-vis reactants, which is explained by the chemical structure.

In the prior art, combinations of tannin and lactose or tannin with $SiO_2$ or tannin, lactose and amines are proposed as binders. According to the present invention, only the combination of lactose and tannin and fine-grained $SiO_2$ results in a useful binder for coarse-grained, carbon-bonded and, in particular, graphite-containing refractory products, which, however, only with the addition of Al result in sufficient strengths to enable the use in refractory applications. Although the porosity requirements are additionally emphasized, according to the present invention, a minimal addition of the phenolic powder resin is necessary in the range of up to 30% in the mixture of lactose and tannin (e.g. 70% lactose and tannin and 30% phenolic resin).

The combined binder system according to the present invention based on tannin and lactose and $SiO_2$ and Al in combination with an inorganic coarse granulation for carbon-bound, graphite-containing products in refractory applications is not known in the prior art.

DE 697 30 221 relates to a thermosetting adhesive composition based on condensed tannins. It is used as an adhesive for making wood-based materials, for example chipboard, fiberboard (MDF), plywood, molded plates and laminates, in the wood industry.

In DE 44 06 825 [U.S. Pat. No. 5,532,330], addition of $SiO_2$ is employed as a hardener in different concentration steps having different types of tannins. This binder or adhesive is also significant for the woodworking industry.

In DE 103 04 748, compounds made up of binders, fillers and additives are described that are sprayable at ambient temperature and heat curable at temperatures above 150° C. They include paint sludges or powder coatings that are, inter alia, charged with tannin to achieve better 6/11 handling. These are used as coating materials or sound-insulating materials in the field of automotive and mechanical engineering.

DE 696 06 052 [U.S. Pat. No. 5,833,883] relates to cross-linked bio-based materials for making printed circuit boards. These materials can have different origins, for example lignin, also modified lignin, vegetable oils, tree resins, tannins, polysaccharide resins, celluloses or also modified celluloses.

Published patent application DE 1470914 [U.S. Pat. No. 3,513,001] describes a method of making thermosetting (about 150° C.) compounds for fine-grained, graphite-free casting compounds for the mold casting of metallic melts in foundries. These compounds are made of carbohydrates, a sulphated tannin, amines and cross-linking agents, for example Hexamethylenetetramine (HEXA) that are reacted. They are used for mold casting in foundries. This compound can also find application in the manufacture of plastic articles, sintered or porous metal products, foamed thermal insulation material, cores and molds together with clay or ceramic binders.

DE 2050501 relates to cross-linking and resin-forming agents for molding sand. They include reducing sugars, phosphoric acid, polyhydric phenols and water.

WO 2010/037699 [US 2011/0182796] concerns itself with the pyrolysis of pure carbohydrates without inorganic fine or coarse granulation that do not foam with the aid of added $SiO_2$, and thus a graphite-containing residue is formed which can be further used.

DE 2249103 [U.S. Pat. No. 3,808,159] describes a method of making refractory and flameproof resinous foams using reducing sugars, phosphoric acid, liquidizers, polyhydric phenols, organic polyisocyanates, powders of a polyvalent metal and an additional hardener.

In DE 2759132 [GB 1,575,649], reducing sugars, liquid resin formers, phosphoric acid, liquefiers, polyhydric phenols and an expanding or foaming agent releasing gas are used to prepare a coating material. When exposed to elevated heat, this coating forms a thermal insulating foam barrier, and under prolonged exposure to heat, it evolves into a porous, non-combustible coke or residue that is non-flammable.

EP 2 740 768 [US 2014/0238268] presents a method for pressing tannin-containing mixtures under heat and pressure. In so doing, plastic-like bodies and wood-containing adhesively bonded chipboards are produced without petroleum products. For this purpose, vegetable material, polycarboxylic acid and saccharides are mixed and melted at temperatures up to max. 250° C.

For users of refractory molded bodies at high operating temperatures, in particular above 1500° C., improved mechanical, thermal and chemical properties (creep resistance, thermal shock and corrosion resistance) are desirable in order to increase the service life of highly stressed refractory products. According to the present invention, by combining inorganic coarse and fine granules with graphite, tannin and lactose in refractory products, on the one hand high green strengths are obtained in the primary shaping process for pressing, molding and extruding giving the absolutely environmentally friendly refractory products excellent mechanical properties. According to the invention, fine-grained $SiO_2$ smaller than 10 μm are added to the two binders—tannin and lactose—to defuse the volume expansion during the thermal treatment, and aluminum powder smaller than 200 μm is added to achieve cold compressive strengths greater than 35 MPa after a temperature treatment above 600° with exclusion of oxygen (coking requirements of carbon-bonded refractory products).

According to the present invention, metallic silicon and/or semiconducting silicon, for example including phosphorus doping, is added to the binder system that is made of lactose, tannin, $SiO_2$ and aluminum, to increase the residual carbon content.

In order to optimize the oxidation resistance of the newly developed binder system, according to the present invention, further fine-grained additives such as Mg or carbides, for example SiC, $B_4C$, TiC, or nitrides, for example $Si_3N_4$, AlN, TiN, or borides, for example BN, $TiB_2$, can be added.

The present invention is described in greater detail on the basis of the subsequent examples.

Examples 1 and 2 are mixtures for carbon-bonded, graphite-containing MgO bricks.

After mixing the oxides with the binder system in an Eirich intensive mixer, uniaxial pressing for the brick formats follow an annealing at temperatures below 250° C. and then a coking at temperatures greater than 800° C.

In the coked state, cylinder samples from the brick products reach cold compressive strengths greater than 40 MPa and porosities of less than 14%, and bending rods from the plug geometries reach flexural strengths greater than 3 MPa and porosities less than 18%.

All percentages are by weight percent, and namely based on the total compound of oxide that is respectively 100%.

EXAMPLES

Example 1

| raw materials | % |
| --- | --- |
| oxide | |
| sintered magnesia <0.09 mm | 23 |
| sintered magnesia 0-1 mm | 20 |
| sintered magnesia 1-3 mm | 37 |
| sintered magnesia 3-6 mm | 20 |
| graphite | 3.6 |
| binder | |
| tannin | 3.4 |
| lactose | 0.75 |
| $SiO_2$ | 0.23 |
| aluminum | 2.0 |
| HEXA | 0.5 |
| ethylene glycol | 1.5 |

Example 2

| raw materials | % |
| --- | --- |
| oxide | |
| sintered magnesia <0.09 mm | 23 |
| sintered magnesia 0-1 mm | 20 |
| sintered magnesia 1-3 mm | 37 |
| sintered magnesia 3-6 mm | 20 |
| graphite | 3.6 |
| binder | |

-continued

| raw materials | % |
|---|---|
| tannin | 3.4 |
| lactose | 0.75 |
| SiO$_2$ | 0.23 |
| aluminum | 2.0 |
| HEXA | 0.5 |
| ethylene glycol | 1.5 |
| phenolic resin (powder) | 1.0 |

What is claimed is:

1. A compound for making high-temperature-resistant or refractory molded bodies, the compound including a mixture of:
 a refractory or high-temperature-resistant inorganic powder, granules and/or granulate, and
 a binder made of a combination of tannin, lactose, fine-grained silica and aluminum powder.

2. The compound defined in claim 1, wherein a proportion of the binder of up to 50 wt. % is added to the compound.

3. The compound defined in claim 1, wherein the ratio of lactose to tannin is between 0.1:1 and 0.3:1.

4. The compound defined in claim 1, wherein the fine-grained silica has a particle size smaller than 50 μm.

5. The compound defined in claim 1, wherein phenolic resin in powder form of up to 30 wt. % based on the mixture of lactose and tannin is added to the binder.

6. The compound defined in claim 1, wherein further fine-grained additives are added to the binder, namely SiC, B$_4$C, TiC, Si$_3$N$_4$, AlN, TiN, or borides.

7. The compound defined in claim 1, wherein doped silicon is added to the binder.

8. The compound defined in claim 1, wherein ethylene glycol is added to the binder in an amount of 0.1 to 5 wt %.

9. The compound defined in claim 1, wherein the proportion of tannin is greater than the proportion of lactose.

10. The compound defined in claim 1, wherein the carbon is graphite and/or carbon black and/or carbon fiber material and/or carbon nanotubes (CNTs) and/or graphene and/or carbonized pitch, bitumen or phenolic resin.

11. A compound for making high-temperature-resistant or refractory molded bodies, the compound including a mixture of:
 a refractory or high-temperature-resistant inorganic powder, granules and/or granulate,
 a free-flowing compound or a powder made of carbon, and
 a binder made of a combination of tannin, lactose, fine-grained silica and aluminum powder.

12. The compound defined in claim 11, wherein the ratio of lactose to tannin is between 0.1:1 and 0.3:1.

13. The compound defined in claim 11, wherein the fine-grained silica has a particle size smaller than 50 μm.

14. The compound defined in claim 11, wherein phenolic resin in powder form of up to 30 wt. % based on the mixture of lactose and tannin is added to the binder.

15. The compound defined in claim 11, wherein further fine-grained additives are added to the binder, namely SiC, B$_4$C, TiC, Si$_3$N$_4$, AlN, TiN, or borides.

16. The compound defined in claim 11, wherein doped silicon is added to the binder.

17. The compound defined in claim 11, wherein ethylene glycol is added to the binder in an amount of 0.1 to 5 wt %.

18. The compound defined in claim 11, wherein the proportion of tannin is greater than the proportion of lactose.

19. The compound defined in claim 11, wherein the carbon is graphite and/or carbon black and/or carbon fiber material and/or carbon nanotubes (CNTs) and/or graphene and/or carbonized pitch, bitumen or phenolic resin.

20. A method of making refractory or high-temperature-resistant molded bodies or compounds including a high-temperature-resistant or refractory inorganic powder, granules and/or granulate and a binder, the method comprising the steps of:
 adding at least one inorganic coarse granulation of >100 μm and carbon having a combined binder based on tannin, lactose, fine-grained silica and aluminum powder to an inorganic fine granulation of <100 μm to form a mixture;
 transforming the mixture via a primary shaping method into a product; and
 treating the product thermally before or during use at temperatures greater than 100° C. while excluding oxygen.

* * * * *